US009604165B2

(12) United States Patent
Nair

(10) Patent No.: US 9,604,165 B2
(45) Date of Patent: Mar. 28, 2017

(54) FILTER ADAPTER FOR A FUEL INJECTOR

(71) Applicant: Caterpillar Inc., Peoria, IL (US)

(72) Inventor: Siddharth Nair, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/801,537

(22) Filed: Jul. 16, 2015

(65) Prior Publication Data
US 2017/0014741 A1    Jan. 19, 2017

(51) Int. Cl.
*B01D 35/30* (2006.01)
*F02M 37/22* (2006.01)
*B01D 35/00* (2006.01)

(52) U.S. Cl.
CPC ......... *B01D 35/306* (2013.01); *B01D 35/005* (2013.01); *F02M 37/22* (2013.01)

(58) Field of Classification Search
CPC .. F02M 61/165; F02M 2200/27; F02M 37/22; B01D 29/0097; B01D 29/56; B01D 29/58; B01D 35/005; B01D 35/30; B01D 35/306
See application file for complete search history.

(56) References Cited

U.S. PATENT DOCUMENTS 5,092,999 A * 3/1992 Valenzuela .......... B01D 29/114
                                                  210/321.72
5,560,825 A    10/1996 Shafer
7,828,154 B2   11/2010 Ringenberger

FOREIGN PATENT DOCUMENTS

| DE | 4421881 | 1/1996 |
|---|---|---|
| DE | 10 2006 047 557 | 4/2008 |
| DE | 10 2009 029 667 | 3/2011 |
| DE | 102013201897 | * 8/2014 |
| EP | 1621765 | 2/2006 |
| EP | 1 918 576 | 5/2008 |
| EP | 2 749 335 | 7/2014 |
| WO | WO 2014/121996 | 8/2014 |

* cited by examiner

*Primary Examiner* — Christopher Kim
(74) *Attorney, Agent, or Firm* — Finnegan, Henderson, Farabow, Garrett & Dunner, LLP

(57) ABSTRACT

A filter adapter for a fuel injector is disclosed. The filter adapter may have a filter housing. The filter housing may have a first connection end and a second connection end. The filter housing may also have a through bore extending through the filter housing between the first connection end and the second connection end and forming a filter cavity. The filter adapter may also have a first filter positioned in the filter cavity and including a first plurality of openings and a second filter positioned in the filter cavity and including a second plurality of openings. The first connection end may have a first connector configured to mate with a fuel outlet of a first fuel system component. The second connection end may have a second connector configured to mate with a fuel inlet of a second fuel system component.

20 Claims, 4 Drawing Sheets

FILTER ADAPTER FOR A FUEL INJECTOR

TECHNICAL FIELD

The present disclosure relates generally to a filter adapter and, more particularly, to a filter adapter for a fuel injector.

BACKGROUND

Many engines include fuel injectors that supply fuel to one or more cylinders of the engine. These engines operate more effectively when the fuel that is delivered to the cylinders is relatively free of contaminants. This is because contaminants, if not removed, lead to undesirable operation of the engine and/or increase the wear rate of engine components. Fuel injectors, which may have orifices manufactured to precise tolerances and shapes, may be particularly susceptible to damage and/or impairment by contaminants such as dirt and debris. For these reasons, many engines employ a filter to help clean fuel of contaminants before the fuel reaches the fuel injectors orifices.

One example of a conventional fuel filter is an edge filter, which may be press fit into a cavity of a fuel system component, such as a fuel injector. An example of an edge filter is disclosed in U.S. Pat. No. 5,560,825, which issued on Oct. 1, 1996 ("the '825 patent). Typical edge filters, such as the edge filter of the '825 patent, form passageways at gaps between edges of the filter and a wall of the associated cavity. These passageways allow fuel to pass through, but block particles that do not fit through the gaps.

While edge filters may help to prevent some contaminants from reaching fuel injector orifices, they may suffer from some drawbacks. For example, the gaps formed by edge filters may be elongated, allowing debris that may be small in only one dimension (but relatively large in the other dimensions) to pass through. In addition, many edge filters are difficult to service because they are often press fit into a cavity formed in the fuel injector itself. This configuration limits access to the filter, rendering it difficult for an operator to determine whether the filter is plugged or clogged. Moreover, if the filter does become plugged or clogged, the entire fuel injector may need to be replaced because the filter alone cannot be changed.

The present disclosure is directed at overcoming one or more of the shortcomings set forth above and/or other problems of the prior art.

SUMMARY OF THE DISCLOSURE

In one aspect, the present disclosure is directed to a filter adapter for a fuel injector. The filter adapter may include a filter housing. The filter housing may include a first connection end and a second connection end. The filter housing may also include a through bore extending through the filter housing between the first connection end and the second connection end and forming a filter cavity. The filter adapter may also include a first filter positioned in the filter cavity and including a first plurality of openings and a second filter positioned in the filter cavity and including a second plurality of openings. The first connection end may include a first connector configured to mate with a fuel outlet of a first fuel system component. The second connection end may include a second connector configured to mate with a fuel inlet of a second fuel system component.

In another aspect, the present disclosure is directed to a filter adapter for a fuel injector. The filter adapter may include a filter housing. The filter housing may include a first connection end and a second connection end. The filter housing may also include a through bore extending through the filter housing between the first connection end and the second connection end and forming a filter cavity. The filter adapter may also include a first filter and a second filter positioned in the filter cavity. The first filter may include a cylindrical collar portion, a container portion including a converging section and a rounded tip, and a first plurality of openings formed in the container portion. The second filter may include a cylindrical collar portion, a container portion including a converging section and a rounded tip, and a second plurality of openings formed in the container portion. The first filter may be press fit into the cavity in a first orientation and the second filter may be press fit into the cavity in a second orientation, the first orientation and the second orientation being mirror images.

In yet another aspect, the present disclosure is directed to a fuel injector for an engine. The fuel injector may include an injector body and a filter adapter. The injector body may include an injector coupling at a fuel inlet and including a threaded connector, and an injector outlet. The filter adapter may include a filter housing. The filter housing may include a first connection end and a second connection end. The filter housing may also include a through bore extending through the filter housing between the first connection end and the second connection end and forming a filter cavity. The filter adapter may further include a first filter positioned in the filter cavity and including a first plurality of openings and a second filter positioned in the filter cavity and including a second plurality of openings. The first connection end may include a first connector configured to mate with a fuel outlet of a fuel line. The second connection end may include a second connector that removably engages the threaded connector such that the filter adapter is removable from the injector body.

DETAILED DESCRIPTION

Figure 1:
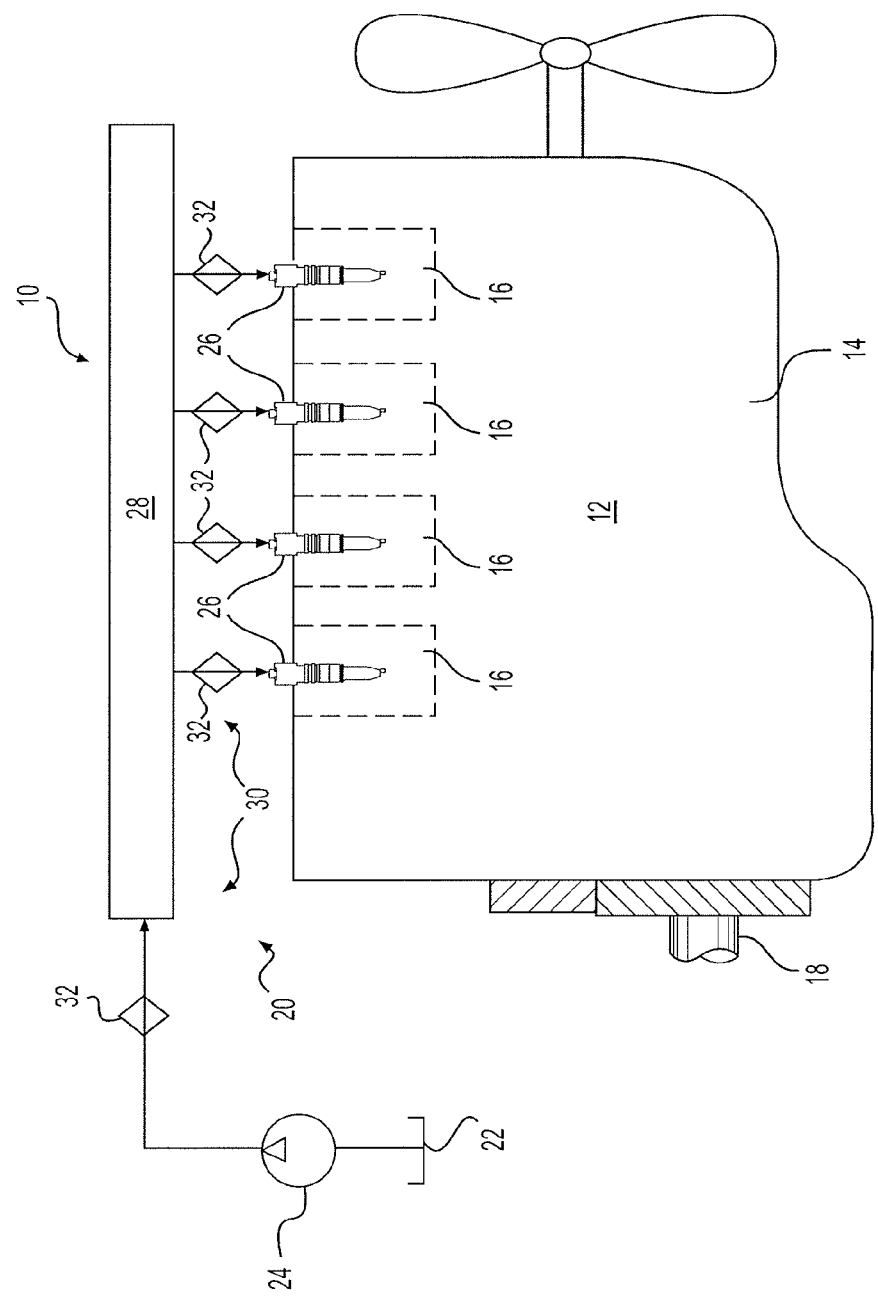
FIG. 1 is a schematic illustration of an exemplary embodiment of a power system.

FIG. 1 illustrates an exemplary embodiment of a power system 10 configured to convert fuel and air into mechanical power. Power system 10 may include an engine 12 (e.g., a four-stroke compression-ignition engine). One skilled in the art will recognize that engine 12 may be any type of internal combustion engine, such as, for example, a spark-ignition engine, a gasoline engine, a diesel engine, a gaseous fuel-powered engine, a dual-fuel engine, etc. Engine 12 may include an engine block 14 that at least partially defines a plurality of cylinders 16. As shown in FIG. 1, exemplary engine 12 may include four cylinders 16. It is contemplated that engine 12 may include a greater or lesser number of cylinders 16, and that cylinders 16 may be disposed in any configuration, such as, for example, in an "in-line" configuration, a "V" configuration, or any other known configuration. Engine 12 may include a crankshaft 18 that is rotatably disposed within block 14. Connecting rods (not shown) may connect a plurality of pistons (not shown) to crankshaft 18, so that combustion within a cylinder 16 results in a sliding motion of each piston within a respective cylinder 16, which, in turn, results in rotation of crankshaft 18, as is conventional in a reciprocating-piston engine.

Power system 10 may include a fuel system 20 configured to deliver injections of pressurized fuel into corresponding combustion chambers of each cylinder 16 according to a timing scheme, resulting in coordinated combustion within cylinders 16 to produce mechanical power. For example, fuel system 20 may be a high-pressure common rail system and may include a tank 22 configured to hold a supply of fuel, and a fuel pump 24 configured to flow and/or pressurize the fuel and direct the fuel to a plurality of fuel injectors 26 associated with cylinders 16 via a common rail 28. While fuel system 20 is described as a common rail system, it should be understood that other fuel system configurations may be possible. For example, fuel system 20 may include dedicated fuel lines that supply fuel directly from tank 22 to fuel injectors 26.

Power system 10 may further include a filtering system 30 configured to filter fuel prior to the fuel reaching the combustion chambers of cylinders 16. Filtering system 30 may include one or more filtering devices 32 positioned at a selected location along a fuel path between tank 22 and the combustion chambers. Each filtering device 32 may be configured to allow the fuel to pass through while removing at least some contaminants that are in the fuel. For example, one or more of filtering devices 32 may be configured to remove dirt and debris from the fuel. In some embodiments, one or more filtering devices 32 may be additionally or alternatively configured to remove other contaminants from the fuel, such as water, air, oil, etc.

As shown in FIG. 1, filtering system 30 may include a plurality of filtering devices 32 positioned in the fuel paths between fuel injectors 26 and common rail 28. Filtering system 30 may additionally or alternatively include a filtering device 32 positioned between fuel pump 24 and common rail 28. The configuration of filtering system 30 and each filtering device 32 is not limited to the depicted embodiments and may be adapted to match the requirements of the particular power system 10 and engine 12. For example, in some embodiments, the filtering device 32 between fuel pump 24 and common rail 28 may be a different type of filter than the filtering devices 32 between common rail 28 and fuel injectors 26. In other embodiments, additional filtering devices 32 may be included and/or any of depicted filtering devices 32 may be omitted.

Figure 2:
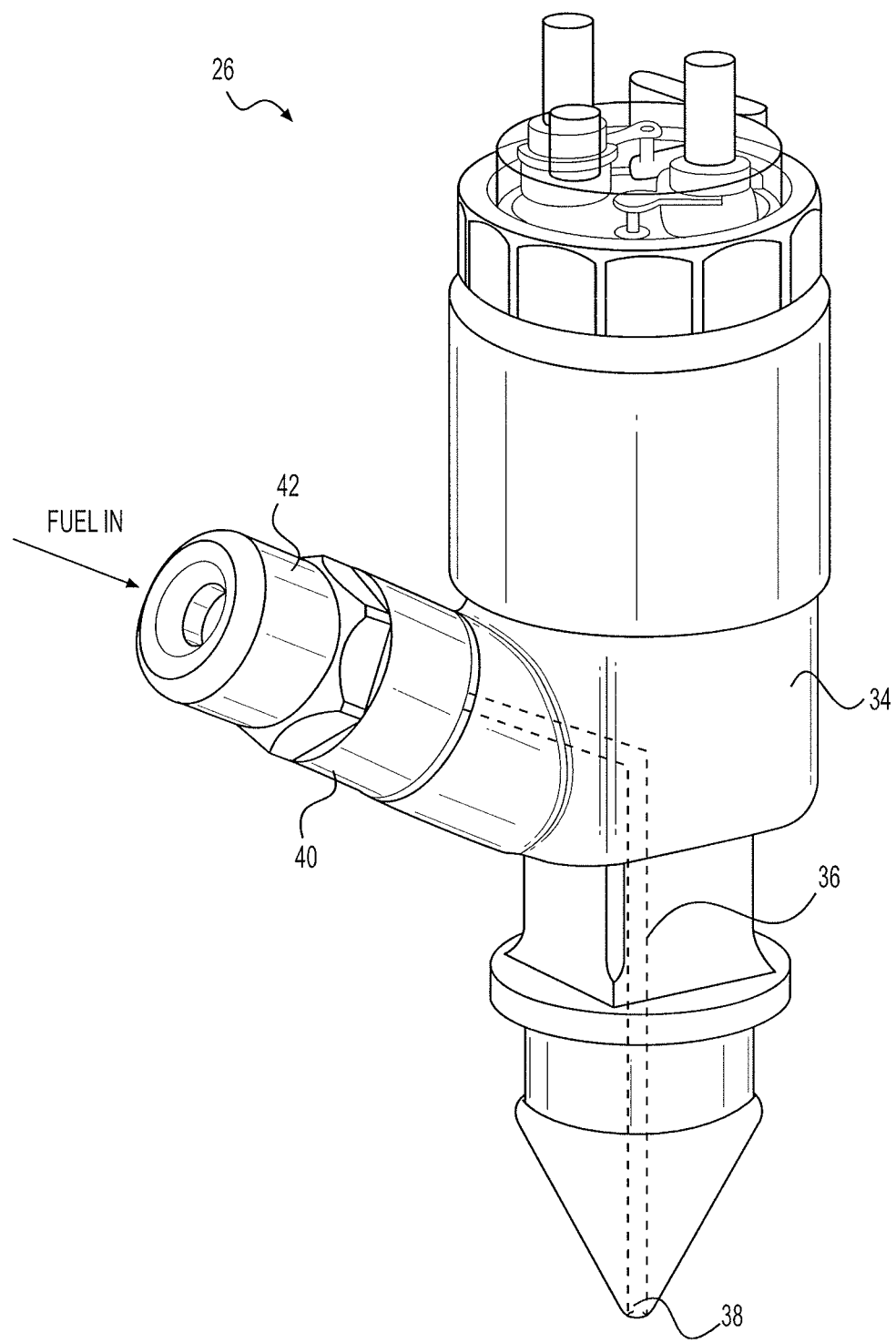
FIG. 2 is an illustration of an exemplary fuel injector having a filter adapter that may be used in conjunction with the power system of FIG. 1.

FIG. 2 illustrates an embodiment of a fuel injector 26. Fuel injector 26 may include an injector body 34 defining an interior fuel channel 36 between a fuel inlet and a fuel outlet. The fuel outlet may be located at an injector outlet 38, which may be positioned to inject fuel into a combustion chamber of a cylinder 16. Injector outlet 38 may be one or more of a nozzle, control valve, opening, etc. The fuel inlet may be located at an injector coupling 40. Injector coupling 40 may be configured to be connected to a fuel line, such as to receive fuel from common rail 28. For example, injector coupling 40 may be an injector inlet arm.

In an exemplary embodiment, a filtering device 32 may be connected between common rail 28 and injector coupling 40. In one embodiment, filtering device 32 may include a filter adapter 42 connected to injector coupling 40. Filter adapter 42 may be a device configured to mate with injector coupling 40 and a fuel line connector to receive fuel from common rail 28 and provide the fuel to the fuel inlet of interior fuel channel 36. Filter adapter 42 may further house a filtering material (e.g., a filter) configured to remove contaminants from the fuel as the fuel passes through filter adapter 42, as will be described in more detail below.

Figure 3:
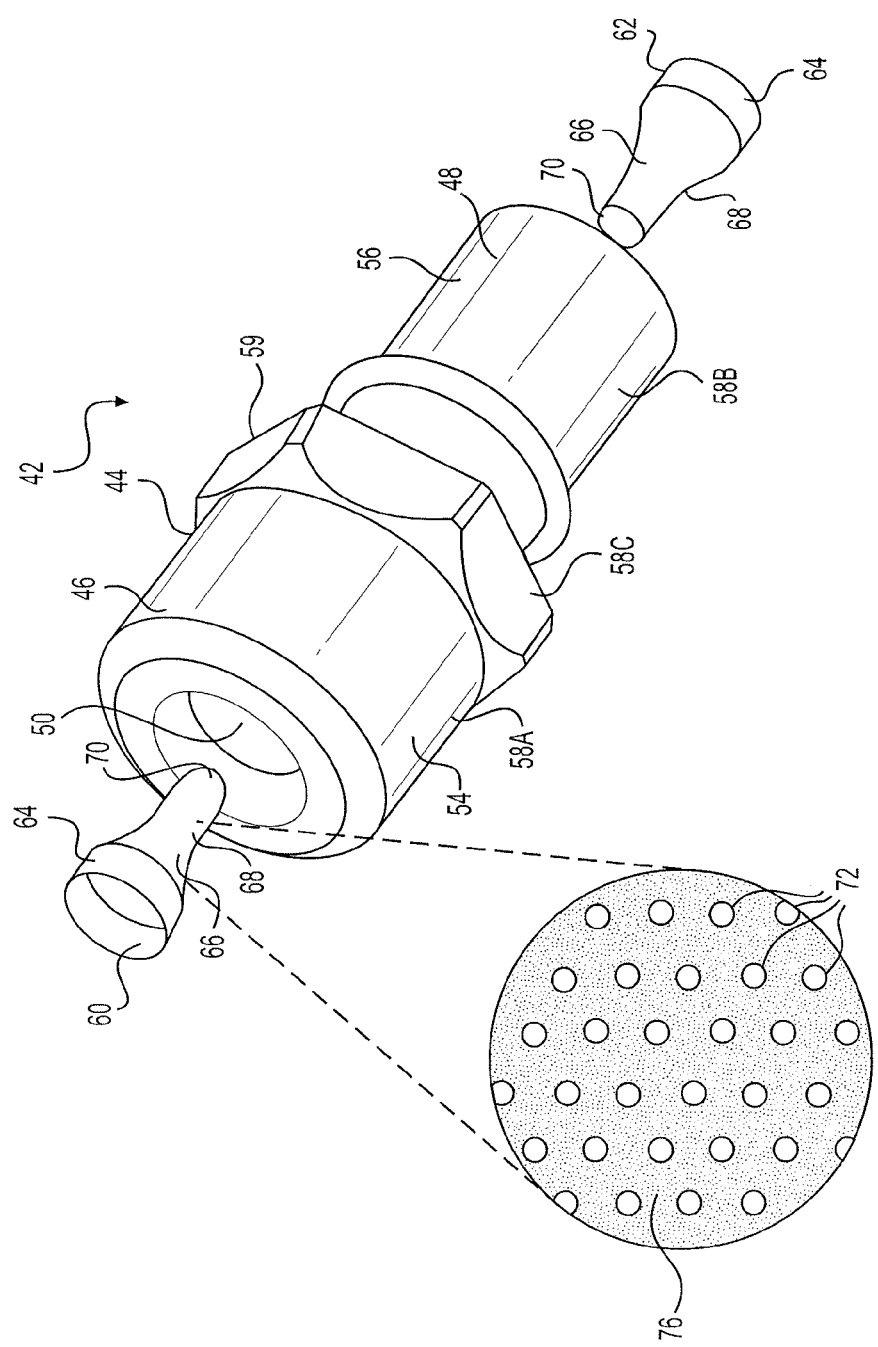
FIG. 3 is an exploded-view illustration of the filter adapter of FIG. 2.

FIG. 3 depicts an exemplary embodiment of filter adapter 42. Filter adapter 42 may include a filter housing 44. Filter housing 44 may be a generally cylindrical component including a first connection end 46 and a second connection end 48. Filter housing 44 may further include a through bore 50 extending through filter housing 44 between first connection end 46 and second connection end 48. Through bore 50 may allow fuel to pass through filter housing 44 from first connection end 46 to second connection end 48. Through bore 50 may form a filter cavity 52 (shown in FIG. 4) configured to retain a filtering material (e.g., one or more filters).

Filter housing 44 may be configured for removable attachment to two fuel system components. For example, filter adapter 44 may be configured for attachment to a fuel outlet at one end (i.e., such that fuel flows into through bore 50) and a fuel inlet at the opposite end (i.e., such that fuel flows out of through bore 50). In one embodiment, first connection end 46 may include a first connector 54 configured to mate with a fuel outlet of a first fuel system component and second connection end 48 may include a second connector 56 configured to mate with a fuel inlet of a second fuel system component. For example, first connector 54 may be configured to mate with a fuel line connector (not shown) and second connector 56 may be configured to mate with injector coupling 40. It should be understood that the depicted embodiment is exemplary and that other configurations are possible, such as to connect filter housing 44 between different fuel system components (e.g., a pair of fuel lines, a fuel line and common rail 28, etc.).

In an exemplary embodiment, first connector 54 and second connector 56 may create removable connections with the adjacent fuel system components. In one embodiment, first connector 54 and second connector 56 may be threaded connectors. For example, first connector 54 may be configured to engage a threaded connection of a fuel line connector (not shown) and second connector 56 may be configured to engage a threaded connection of injector coupling 40 (shown in FIG. 4). It should be understood, however, that other removable connections, such as clasps, clamps, bolts, etc., are possible to connect filter housing 44 between fuel system components.

In one embodiment, filter housing 44 may include a plurality of sections 58. For example, filter housing 44 may include a first section 58A, a second section 58B, and a third section 58C. The plurality of sections 58 may be shaped and configured to provide a robust and secure connection between fuel system components. First section 58A may include first connector 54 and a first diameter and second section 58B may include second connector 56 and a second diameter. The first diameter may be greater than the second diameter such that a thrust face 59 is formed at third section 58C. Thrust face 59 may be configured to abut a surface of an adjacent fuel system component (e.g., fuel injector 26) in order carry an axial force that may be applied to filter adapter 44 during operation. A diameter of third section 58C may be greater than the diameter of second section 58B to form thrust face 59. In some embodiments, third section 58C may include a diameter that is also greater than the first diameter, such as to further increase the surface area of thrust face 59 and/or to create an ergonomic feature for allowing an operator to easily attach and remove filter adapter 42.

Filter adapter 42 may further include a first filter 60 and a second filter 62 positioned in filter cavity 52. While two filters 60, 62 are depicted and described herein, it should be understood that, in alternative embodiments, any number of filters may be positioned in filter cavity 52. First filter 60 and second filter 62 may be shaped to fit within filter cavity 52. First filter 60 and second filter 62 may be configured to allow fuel to flow through filter cavity 52 while removing contaminants that are contained in the fuel.

In an exemplary embodiment, first filter 60 may include a cylindrical collar portion 64 and a container portion 66. Cylindrical collar portion 64 may include a diameter that is slightly larger than that of filter cavity 52 such that first filter 60 may be press fit into filter cavity 52 and held therein by cylindrical collar portion 64, although other configurations for holding first filter in place are possible. Container portion 66 may be an enclosed portion that receives fuel therein as it passes through filter cavity 52. In an exemplary embodiment, container portion 66 may include a converging portion 68 and a rounded tip 70.

Container portion 66 may further include a plurality of openings 72 formed therein. The plurality of openings may be sized and configured to allow fuel to flow therethrough, while blocking contaminants, such as dirt and debris, from traveling therethrough. In an exemplary embodiment, the plurality of openings 72 may be formed such that first filter 60 is configured to remove contaminants that may be relatively small in only one dimension. For example, the plurality of openings 72 may each include a diameter that is approximately 65 μm. In this way, first filter 60 may be configured to remove particles with sizes that are greater than 65 μm in at least two dimensions.

In an exemplary embodiment, second filter 62 may be identical to first filter 60. For example, second filter 62 may also include a cylindrical collar portion 64 and container portion 66. The container portion 66 of second filter 62 may also include a converging portion 68 and a rounded tip 70. Second filter 62 may also include a plurality of openings 72 configured to allow fuel to pass through while blocking contaminants. In one embodiment, second filter 62 may act as a second stage filter, configured to remove contaminants that are able to pass through first filter 60.

Figure 4:
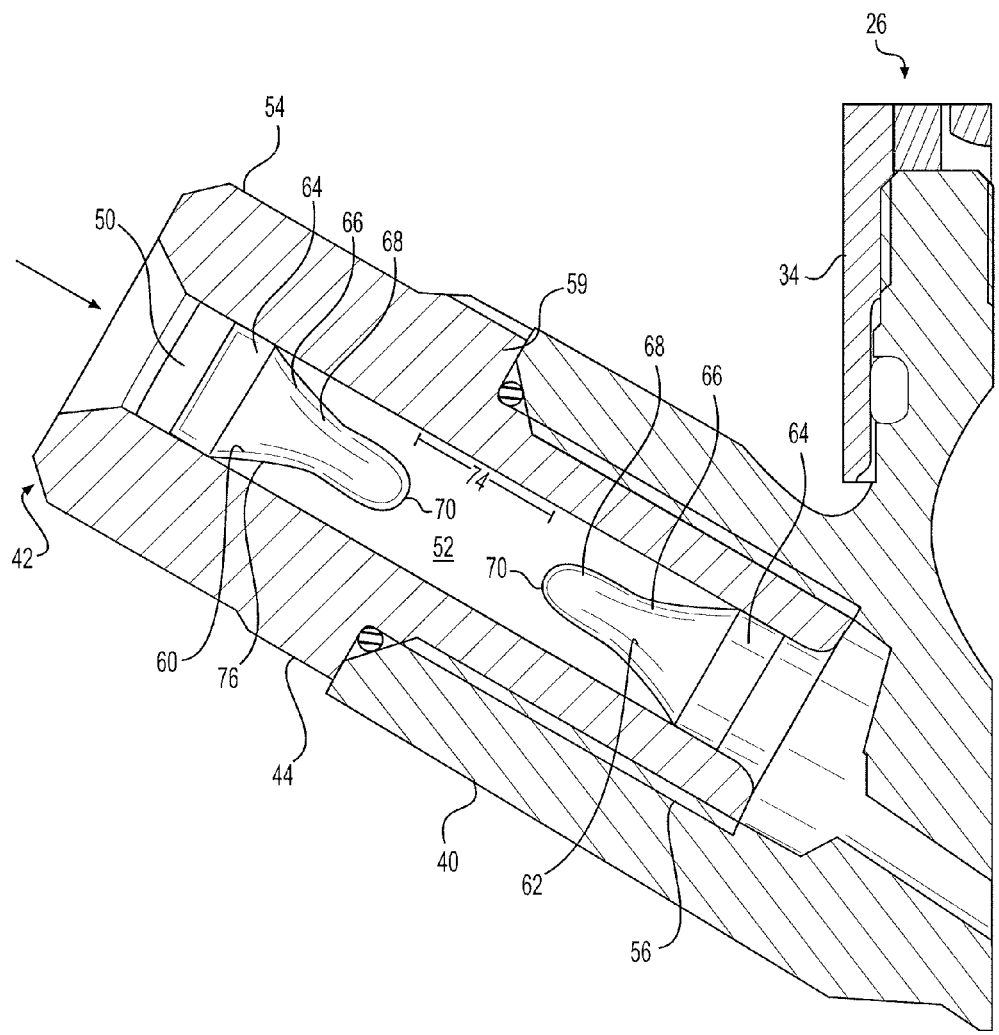
FIG. 4 is a sectional illustration of the fuel injector and filter adapter of FIG. 2.

FIG. 4 depicts filter adapter 42 connected to fuel injector 26. As shown in FIG. 4, second connector 56 removably engages a connector of injector coupling 40 with thrust face 59 abutting a surface thereof. In this way, filter adapter 42 may be easily connected to and/or removed from fuel injector 26, such as to be installed or replaced. Further, the connection may be secure and durable. Filters 60, 62 may be positioned in filter cavity 52 such that fuel comes into contact with container portions 66. First filter 60 may be press fit into filter cavity 52 in a first orientation and second filter 62 may be press fit into filter cavity 52 in a second orientation.

In an exemplary embodiment, the first orientation and the second orientation may be mirror images (as shown in FIG. 4). In this way, fuel may flow into an interior portion of container portion 66 of first filter 60 and therethrough, and then the fuel may flow into contact with an exterior portion of container portion 66 of second filter 62 and therethrough. This may allow for more complex filtration of the fuel, creating different flow paths that may enhance the ability of filters 60, 62 to block particles from passing therethrough. In other embodiments, the first and second orientations may be the same, such as to allow first and second filters 60, 62 to be press fit into filter cavity 52 from the same direction.

As shown in FIG. 4, first filter 60 and second filter 62 may be positioned in filter cavity 52 in such a way that a space 74 is created therebetween. In an exemplary embodiment, an axial length of space 74 may be greater than half of an axial length of first filter 60 and/or second filter 62. Space 74 may serve several purposes. For example, space 74 may allow any particles that pass through first filter 60 to rotate/change directions prior to reaching second filter 62, thereby enhancing the likelihood that the particles will be blocked by second filter 62. In addition, space 74 may allow first filter 60 and second filter 62 to move relative to each other during operation of fuel adapter 42. This relative movement may provide a dampening effect that helps to reduce pressure pulsation that may occur as a result of a pressure drop caused by fuel passing through filters 60, 62.

Filters 60, 62 may include a wall member 76 that defines the cylindrical collar portions 64 and container portions 66. In an exemplary embodiment, wall member 76 may include a wall thickness at the cylindrical collar portions 66 that is approximately equal to a wall thickness at the container portions 66. In this way, filters 60, 62 may be formed from a uniform material. In addition, this configuration may allow an inner diameter of cylindrical collar portions 66 to be approximately equal to an inner diameter of filter cavity 52, which allows for an efficient flow of fuel therethrough with minimal disturbance by an edge of cylindrical collar portions 66.

It should be understood that the depicted and described shape and configuration of the first filter and second filters 60, 62 is exemplary. The shape of the filters 60, 62 and the shape and size of the plurality of openings 72 may depend on other factors, such as surface area, pressure drop, etc., desired for a particular filter adapter 42. Further, in some embodiments, filters 60, 62 may include different shapes, different sizes, different shape or size openings, etc.

INDUSTRIAL APPLICABILITY

The disclosed filter adapter may be applicable to a remove contaminants, such as dirt and debris, from a liquid that is directed therethrough. The disclosed filter adapter is configured as a modular component with connectors at either end that allow a filter housing to be easily attached between two components to insert a filtering member into an associated flow path. The disclosed filter adapter may be particularly applicable to fuel systems for engines, which require contaminants to be removed from fuel for efficient operation. Because it is easily installed and removed from a fuel system component, the disclosed filter adapter provides an advantage in that it is easily accessed and replaceable. The disclosed filters that may be used in conjunction with the disclosed filter adapter may also provide several advantages, including robust removal of contaminants and pulsation dampening.

In order to assembly filter adapter 42, filters 60, 62 may be press fit into filter cavity 52. Cylindrical collar portions 64 may be sized to hold filters 60, 62 in place with space 74 therebetween. Cylindrical collar portions 64 may be sized and shaped, however, to allow for relative movement of filters 60, 62, such that the axial length of space 74 changes during operation of engine 12 and filter adapter 42.

In order to install filter adapter 42, first and second connectors 54, 56 may be removably secured to corresponding fuel system components. For example, a fuel line may be threaded onto first connector 54 and second connector 56 may be threaded into injector coupling 40 until thrust face 59 abuts a corresponding surface of fuel injector 26.

During operation, fuel may flow into through bore 50 at first connection end 46 such that it reaches filter cavity 52. Fuel may then flow through the openings 72 in first filter 60, with particles that are larger than the diameter of the openings 72 in at least two dimensions being blocked from passing therethrough (as well as most particles with at least one dimension larger than the diameter of the openings 72 being blocked, due to the orientation of the particles). The fuel may then flow through the space 74 and into contact with a second filter 62, passing therethrough. Most, if not all, of the particles that were able to pass through first filter 60 and are larger than the diameter of openings 72 in at least one dimension are blocked by second filter 62. The fuel flows out of filter cavity 52 at second connection end 48 and into fuel channel 36 before being injected into a combustion chamber of a corresponding cylinder 16 through injector outlet 38. At this point, the fuel has been sufficiently cleaned of contaminant particles such that fuel injector 26 may operate efficiently for a long part lifetime.

Further, the configuration of filter adapter 42 allows filters 60, 62 to be monitored and inspected to determine whether the filter adapter should be replaced. Because the filter adapter 42 is removably attached to the corresponding fuel system components, this task is easily achieved. An operator may simply disconnect filter adapter 42 and replace it with another filter adapter 42 as necessary. This functionality also allows for interchangeability of different types of filters having different filtering properties, such as to provide filter adaptability to fuel system 20. For example, different filters may be easily installed and used at different times, depending on the filtering requirements of engine 12.

The disclosed filter adapter provides advantages over previous filters (e.g., edge filters) which are not easily inspected or replaced, thereby providing cost savings. For example, where an entire fuel injector may have needed to be replaced due to a clogged filter, use of the disclosed embodiments allows only the filter adapter to be changed. In addition, the disclosed filter adapter includes a configuration of filtering material that effectively blocks contaminants and dampens pressure pulsation by avoiding large edges within the flow and allowing relative movement of multiple filters.

It will be apparent to those skilled in the art that various modifications and variations can be made to the disclosed filter adapter for a fuel injector. Other embodiments will be apparent to those skilled in the art from consideration of the specification and practice of the disclosed filter adapter for a fuel injector. It is intended that the specification and examples be considered as exemplary only, with a true scope being indicated by the following claims and their equivalents.

What is claimed is:

1. A filter adapter for a fuel injector, comprising:
    a filter housing extending from a first connection end to a second connection end, the filter housing comprising:
        a first section extending from the first connection end towards a thrust face disposed between the first connection end and the second connection end, the first section having a first outer diameter;
        a second section extending from the thrust face to the second connection end, the second section having a second outer diameter different from the first outer diameter adjacent the thrust face;
        a through bore extending through the filter housing between the first connection end and the second connection end and forming a filter cavity;
    a first filter positioned in the filter cavity and including a first plurality of openings, the first filter at least partially disposed in the first section;
    a second filter positioned in the filter cavity in the second section and including a second plurality of openings;
    a first connector disposed adjacent the first connector end and configured to mate with a fuel outlet of a first fuel system component; and
    a second connector disposed adjacent the second connector end and configured to mate with a fuel inlet of a second fuel system component.

2. The filter adapter of claim 1, wherein at least one of the first connector and the second connector is a threaded connector.

3. The filter adapter of claim 1, wherein
    the first connector extends into the through bore from the first connection end, and
    the second connector extends into the through bore from the second connection end.

4. The filter adapter of claim 1, wherein the first outer diameter is greater than the second outer diameter.

5. The filter adapter of claim 1, further including a third section between the first section and the second section, the third section having a third outer diameter that is greater than the second outer diameter.

6. The filter adapter of claim 5, wherein the third section defines the thrust face configured to abut an end surface of an adjacent fuel system component.

7. The filter adapter of claim 1, wherein the first filter includes a cylindrical collar portion disposed in the through bore and a container portion, the container portion including a converging section and a rounded tip.

8. The filter adapter of claim 7, wherein a wall thickness of the cylindrical collar portion is approximately equal to a wall thickness of the container portion.

9. The filter adapter of claim 7, wherein the second filter includes a cylindrical collar portion and a container portion, the container portion including a converging section and a rounded tip.

10. The filter adapter of claim 1, wherein the first filter is press fit into the filter cavity in a first orientation and the second filter is press fit into the filter cavity in a second orientation, and wherein the first orientation and the second orientation are mirror images.

11. The filter adapter of claim 1, wherein the first filter and the second filter are positioned inside the filter cavity such that a space is formed between the first filter and the second filter.

12. The filter adapter of claim 11, wherein the space includes an axial length that is greater than a distance equal to half of an axial length of the first filter.

13. A filter adapter for a fuel injector, comprising:
    a filter housing extending from a first connection end to a second connection end, the filter housing, comprising:
        a first section extending from the first connection end towards a thrust face disposed between the first connection end and the second connection end, the first section having a first outer diameter;
        a second section extending from the thrust face to the second connection end, the second section having a second outer diameter different from the first diameter;
        a third section disposed between the first section and the second section, the third section having a third outer diameter different from the second diameter;

a through bore extending through the filter housing between the first connection end and the second connection end and forming a filter cavity;
a first filter positioned in the filter cavity and including:
a cylindrical collar portion;
a container portion, the container portion including a converging section and a rounded tip; and
a first plurality of openings formed in the container portion;
a second filter positioned in the filter cavity and including
a cylindrical collar portion;
a container portion, the container portion including a converging section and a rounded tip; and
a second plurality of openings formed in the container portion,
wherein the first filter is press fit into the cavity in a first orientation and the second filter is press fit into the cavity in a second orientation, and wherein the first orientation and the second orientation are mirror images.

14. The filter adapter of claim 13, wherein the first filter and the second filter are positioned inside the filter cavity such that a space is formed between the first filter and the second filter.

15. The filter adapter of claim 14, wherein the space includes an axial length that is greater than a distance equal to half of an axial length of the first filter.

16. The filter adapter of claim 15, wherein the first filter and the second filter are configured to move axially, thereby changing the axial length of the space during operation of the filter adapter.

17. The filter adapter of claim 13, wherein the first plurality of openings and the second plurality of openings are circular.

18. The filter adapter of claim 17, wherein the first plurality of openings and the second plurality of openings have a diameter of approximately 65 μm.

19. The filter adapter of claim 13, wherein a wall thickness of each cylindrical collar portion is approximately equal to a wall thickness of each container portion.

20. A fuel injector for an engine, the fuel injector comprising:
an injector body, comprising:
an injector coupling at a fuel inlet, the injector coupling including a threaded connector; and
an injector outlet; and
a filter adapter, including:
a filter housing extending from a first connection end to a second connection end, the filter housing comprising:
a first section extending from the first connection end towards a thrust face disposed between the first connection end and the second connection end, the first section having a first outer diameter, the thrust face configured to abut an end surface of the injector body;
a second section extending from the thrust face to the second connection end, the second section having a second outer diameter different from the first diameter;
a through bore extending through the filter housing between the first connection end and the second connection end and forming a filter cavity;
a first filter positioned in the filter cavity and including a first plurality of openings; and
a second filter positioned in the filter cavity and including a second plurality of openings;
a first connector disposed adjacent the first connector end and configured to mate with a fuel outlet of a fuel line; and
a second connector disposed adjacent the second connector end and that removably engages the threaded connector such that the filter adapter is removable from the injector body.

\* \* \* \* \*